US012620234B2

(12) United States Patent
Wellhausen et al.

(10) Patent No.: US 12,620,234 B2
(45) Date of Patent: May 5, 2026

(54) OBTAINING INFORMATION ABOUT OBJECTS IN CAMERA IMAGES

(71) Applicant: Robert Bosch GmbH, Stuttgart (DE)

(72) Inventors: Andreas Wellhausen, Elze (DE); Emil Schreiber, Hannover (DE); Florian Richter, Lamspringe (DE); Gregor Blott, Salzgitter (DE); Matthias Kirschner, Hildesheim (DE); Moritz Michael Knorr, Hildesheim (DE); Nils Zerrer, Eindhoven (NL); Sven Wagner, Ihlow (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/805,760

(22) Filed: Aug. 15, 2024

(65) Prior Publication Data

US 2025/0061722 A1 Feb. 20, 2025

(30) Foreign Application Priority Data

Aug. 15, 2023 (DE) ..................... 10 2023 207 836.8

(51) Int. Cl.
*G06V 20/54* (2022.01)
*G06T 7/70* (2017.01)
*G06T 15/00* (2011.01)

(52) U.S. Cl.
CPC ................ *G06V 20/54* (2022.01); *G06T 7/70* (2017.01); *G06T 15/00* (2013.01); *G06T 2207/20084* (2013.01); *G06V 2201/07* (2022.01)

(58) Field of Classification Search
CPC ....................................... G06V 20/54
USPC ......................................... 348/148
See application file for complete search history.

(56) References Cited

U.S. PATENT DOCUMENTS

2022/0414981 A1* 12/2022 Bhargava ................ G06T 19/20

FOREIGN PATENT DOCUMENTS

WO 2021167586 A1 8/2021

* cited by examiner

*Primary Examiner* — Amir Shahnami
(74) *Attorney, Agent, or Firm* — Michael Best & Friedrich LLP

(57) ABSTRACT

In a method (30) for obtaining information (18a, b) about a potential object (8a, b) in a camera image (10) of a scene (2), A) the camera image (10) is provided as a single 2D camera image, B) potential objects (8a, b) are detected in the camera image (10), C) a frame projection (14a, b) of a 3D frame (16) directly surrounding the object (8a, b) into the camera image (10) is determined for at least one of the detected objects (8a, b) as at least part of the information (18a, b), wherein steps B) and C) are each performed with the aid of a neural network (32).

8 Claims, 3 Drawing Sheets

OBTAINING INFORMATION ABOUT OBJECTS IN CAMERA IMAGES

BACKGROUND

Systems and methods for performing object recognition and position estimation in 3D from 2D images are known from WO 2021/167586 A1.

SUMMARY

The invention relates to the detecting and obtaining of information about objects in 2D camera images depicting a real-world scene. In particular, the scene contains at least one road on which vehicles can potentially be present as objects or are regularly present.

The method is used to obtain information about an object, i.e. it is an information-obtaining method. In particular, it is a method for obtaining information about an object during a monitoring task, especially when monitoring road users in a traffic scenario. In particular, in a traffic scenario, the objects about which information is to be obtained can be road users, wherein road users can be static objects, such as traffic infrastructure, or dynamic objects, such as vehicles or pedestrians. The potential object is shown or mapped in a camera image. The camera image represents one such scene. The scene is a section of the real world, for example a section of a traffic network with one or more roads, on which vehicles may move as objects. "Potential" should be understood to mean that a corresponding object is not necessarily depicted in a camera image, for example, if there is simply no object in the scene at the moment or if it is not (recognizably/visibly) depicted in the camera image. In particular, the camera image is available digitally in the form of data that can be processed by the method.

In step A of the method, the camera image is provided as a single 2D camera image, e.g. by generating/recording it from the scene. "Single" should be understood to mean that the method according to the invention is only carried out on this one camera image and not, for example, on an image sequence consisting of several images. The method therefore only evaluates a single two-dimensional image or its image data.

In step B, potential objects are detected in the camera image. This means that the camera image or its image content/image information is evaluated using standard methods and searched for potential objects. Any objects found are detected, e.g. marked, labeled, etc. For example, a camera image is searched for vehicles as objects using standard methods and the vehicles found are marked/localized for further processing of the image.

In a step C, the following procedure is carried out for at least one, in particular several, in particular all of the objects possibly detected in step B:

A frame projection is determined for the respective object as at least part of the information (i.e. at least as partial information of complete "information" that may also contain other aspects/data/partial information) that is to be obtained in the method. The frame projection is the projection into the camera image of a 3D frame (imagined in the real world) directly surrounding the object. In particular, the frame projection and the camera image can be displayed superimposed, but the display is not required for the method described. For the method, it is sufficient to determine the frame projection for the object according to step C. The frame is formed in particular by straight sections. "Directly surrounding" should be understood to mean that a surface defined by the imaginary 3D frame (e.g. polyhedron defined by the frame) surrounds the object tightly/as tightly as possible, for example with the smallest possible volume. The respective surfaces and edges of the surface stretched by the frame touch the surface of the object. In other words, a so-called "3D-bounding box" is determined as a 3D frame. The 3D frame is in particular an enveloping body in the form of a rectangular cuboid.

The decisive factor here is that in step C the determination takes place purely in the two-dimensional image and only this 2-dimensional frame projection of the frame is determined. 3D considerations/evaluations/observations/aspects are not used. It is not the actual three-dimensional imaginary frame that would surround the object in 3D reality itself—i.e. in 3D space—that is calculated, but only its 2D frame projection in or into the camera image.

Steps B and C are each carried out using a neural network. In step C in particular, the neural network is only fed with input variables that are taken exclusively from the 2D camera image or obtained from its data. The output of the neural network is the 2D frame projection or mapping of the imaginary 3D frame in the 2D camera image.

The method therefore only processes information from the 2D camera image and is not partially executed in 3D world coordinates. 3D world coordinates are only determined—if at all—after the method, e.g. in a higher-level monitoring method. The method according to the invention is therefore a pure 2D method with regard to the camera images/the scene and the objects.

In other words, the neural network used for step C "only" learns what the projection of the 3D frame in question would look like in the 2D camera image, but not what the actual imaginary 3D frame that would surround the 3D object depicted would look like in the real world.

By executing the method purely in the two-dimensional range, it can work particularly effectively and quickly and is able to process even complex camera images with a large number of objects quickly, especially in real time (processing time corresponds at most to the time between two frames) when it comes to camera images as frames of a video stream of e.g. 25 or more fps (frames per second). For example, with a 25 fps video stream, only one twenty-fifth of a second is available for the detection of all displayed objects and all desired information, including frame projections.

The information is provided as an output variable of the method, e.g. for further processing as part of a higher-level method or to be shown together with the camera image on a display and shown to a viewer.

In a preferred embodiment, corner points of the 3D frame are determined without using a heat map associated with the camera image. The heat map is a data structure that assigns a value of a specific size to each image section (pixel) of the (digital) 2D camera image. Conceivable heat maps in this context are, for example, the assignment of probabilities, e.g. whether the pixel could be a part of an object depicted in the camera image, its edge, its presumed center, etc.

Alternatively or additionally, the method is carried out without using calibration data. The calibration data is that of a camera generating the camera image. In particular, no data such as the camera's aperture angle or suspension height is used.

Alternatively or additionally, the method is carried out without any assumptions about the scene depicted in the camera image. One such assumption would be that a single flat ground plane is depicted in the camera image or that the scene has a certain basic geometric structure, for example, depicts a certain geometric road layout, etc.

The method can therefore be used universally and easily.

In a preferred embodiment, steps B and C are performed together using a common neural network. In particular, it is a deep neural network (DNN). Both the object detection and the determination of the frame projection of the 3D frame surrounding the object are thus accomplished by a single neural network, which is to be trained solely for this combination task. This makes the method particularly fast and efficient.

In a preferred embodiment, at least one corner point projection is determined for at least one of the objects as part of the information. The corner point projection is the projection of a corner point of the 3D frame into the 2D camera image. Here, too, the determination is carried out in the same way as above, exclusively in the 2D image and not in three-dimensional space. Such "corner points" can be processed particularly easily and therefore form a valuable starting point for the method.

In a preferred embodiment, at least one anchor point projection is determined for at least one of the objects as part of the information. Anchor point projection is also the 2D projection of an imaginary 3D anchor point of the 3D object in the real world into the 2D camera image. Again, as above, it is not the anchor point in the three-dimensional space itself that is determined, but only its 2D image in the camera image. The advantages mentioned above apply accordingly. Such an anchor point is, for example, the geometric center of the side surface of the cuboid facing the ground in the case of a cuboid enveloping body surrounding a vehicle.

In a preferred variant of this embodiment, the anchor point projection is determined (in particular exclusively) based on the frame projection—and/or, if available/determined, the corner point projection—which was previously determined for the object. Determining the anchor point image is thus comparatively simple and can be easily learned, especially using a neural network.

In a preferred embodiment, at least one vehicle is detected as a potential object in the camera image in step B. The detection of vehicles in camera images is a particularly challenging task, which can be solved particularly well by the present method.

In a preferred embodiment, at least one orientation information of the frame and/or object is determined for at least one of the objects as part of the information. The orientation information relates to a specific spatial orientation/alignment of the frame/object. The orientation information is also determined exclusively in 2D in the same way as above. If the object is a vehicle, for example, the orientation information can consist of where the front, rear, top or bottom of the vehicle is located, as well as its current direction of travel and whether it is moving forwards or backwards, for example. In particular, a cross-reference is created between information that was previously carried out on different 2D camera images using the method; in other words, several camera images, for example camera images of a video sequence that follow one another in time, are then evaluated.

A further object of the invention is a method used to monitor vehicles in a scene as described above. The method is therefore a monitoring method.

In the method, a camera image of the scene is provided or generated and processed in the method explained above. The method according to the invention is therefore carried out in order to obtain information about potential objects in the camera image. At least one object in the form of a vehicle present in the scene is detected. Vehicles are therefore (at least also) searched for as special objects in the camera image. Based on the information determined about the objects (if objects were detected and information about them was determined), at least one of the following measures is carried out:

Vehicles are counted on a road in the scene. This assumes that the scene actually depicts a road on which vehicles could potentially be found.

Alternatively or additionally, a traffic light, barrier or similar correlated with the scene is controlled. The traffic light is located in particular on the road or in the scene.

Alternatively or additionally, a crossing of an existing or imaginary line in the scene by an object/vehicle is monitored. The crossing of the line by a vehicle triggers a reaction, e.g. an alarm. For example, it could monitor whether a vehicle is entering a particular road in the wrong direction.

Alternatively or additionally, objects are assigned to a lane in the scene. This assumes that at least one lane of a road is depicted in the scene. The lane is, for example, a lane of a multi-lane road. For example, the traffic density on certain lanes of a road can be determined.

Alternatively or additionally, an incorrect position and/or incorrect movement of an object in the scene is detected. For example, it is possible to monitor whether a vehicle is driving on the wrong side of the road (wrong-way driver) or whether a vehicle is reversing without permission (e.g. in a one-way street or on an expressway or highway).

Alternatively or additionally, a (spatial) relationship between at least two of the detected objects is determined. The prerequisite for this is that at least two objects are actually detected in the camera image. "Relation" here means in particular a spatial relation between the two objects, for example a relative distance between the objects or the anchor point projections of the objects in relation to each other. This allows near-collisions to be detected, for example.

Alternatively or additionally, objects are tracked in the scene. In other words, it tracks over time whether and how a particular object moves through the scene. The prerequisite for this is the evaluation of at least two camera images of the scene recorded at different times.

Alternatively or additionally, 2D image coordinates relating to at least one of the objects are converted into 3D world coordinates. This may concern the (image of the) object itself or at least part of the information about the object. In other words, the spatial position of an object/information in the scene is determined, e.g. a corner point of the selection frame, an anchor point of the object, etc.

Alternatively or additionally, a speed estimation is made for at least one of the objects in the scene. This also requires different camera images over time.

The monitoring method and at least some of its possible embodiments as well as the respective advantages have already been explained analogously in connection with the information-obtaining method according to the invention.

The method can be used to implement multi-layered traffic monitoring in the scene with regard to the various aspects mentioned above.

The invention is based on the following findings, observations or considerations and also has the following preferred embodiments. These embodiments are sometimes also referred to as "the invention" for the sake of simplicity. The embodiments may also include or correspond to parts or combinations of the above-mentioned embodiments and/or may also include previously unmentioned embodiments.

The invention is based on the following considerations:

For the automatic evaluation of monitoring camera footage (camera images), base points (anchor points) of objects (e.g. vehicles or persons) are required for various applications. According to FIG. 1, it would be conceivable to estimate the base point as a pure 2D anchor point 100 of a detected object 8*a,b* (bus and car, passenger vehicle) in the camera image 10, based on a 2D bounding box 106 (2D frame in the camera image 10) at coordinates that correspond to the "half width of the bounding box" and the "lower boundary of the bounding box". These coordinates, also known as anchor points, are used, for example, to determine the 3D coordinates in space, to track objects or to count objects that cross a specified line 26.

However, such a method would be error-prone and not very precise if the camera has large aperture angles and, in particular, special camera poses. Depending on the position and orientation of the object 8*a,b* in image 10, the anchor point 100 will be at a different point on the object or in a different relation to the object (image of the object).

In addition, as shown in FIG. 1, it can sometimes happen that the estimated base point (anchor point 100 of the bus) of a vehicle lies significantly outside (of the image) its actual lane 36. This complicates applications such as lane allocation or traffic counting and makes them prone to errors.

It would be conceivable to develop approaches for improved base point estimation. These work either purely heuristically or are dependent on additional assumptions and information, which makes them less flexible. For example, their reliability depends on whether data for camera calibration (aperture angle, suspension height, etc.), which is complex to determine, is available or which additional, simplifying assumptions, such as the assumption of a single flat ground plane, were used as a basis.

Conceivable approaches based on direct optical detection of prominent points on the vehicle (e.g. wheel axles, bumpers) may have limitations if these points are not visible or not present.

The invention is based on the idea of using a "p3D Vehicle Detector" to precisely determine the corner points (corner point projection) of a 3D bounding box (frame) projected into the camera image (frame projection) and to use these as the basis for robust and stable anchor points (and their anchor point projection).

The most important advantage is that the "3D Bounding Box" describes very robust features on the car such as "front-bottom-right" or "rear-top-left" (corner points/corner point projection) which remain stable and in a fixed relationship to the vehicle over time, even with difficult camera poses.

The basic idea of the invention is the following method: A function (neural network) receives a single camera image as input, automatically detects the relevant objects and estimates the 3D bounding boxes (frame projection) projected into the camera image for these objects. In particular, these two steps are combined within a common deep neural network (DNN). However, completely separate processing of the steps is just as conceivable in principle.

The desired object anchor points (anchor point projections) are derived from the corner points of the projected 3D bounding box (corner point projections) in a simple post-processing step. Depending on the application, slightly different anchor points can be determined (e.g. center of the ground surface, center of the front lower edge of the vehicle, . . . ). The robust anchor points determined in this way are output by the method as metadata and are thus available for subsequent applications (e.g. monitoring methods). If required, they can also be made available externally via a programming interface and thus be used for freely configurable applications.

According to the invention, a robust base point estimation for video-based object detection based on 3D bounding boxes is obtained in particular.

The method according to the invention robustifies various use cases or makes them possible in the first place:

more precise counting of vehicles on roads more robust traffic light control (virtual induction loop)

crossing a line that leads to an alarm better lane allocation of vehicles

Is a vehicle driving on the wrong side of the road? (Is it possibly driving backwards on the wrong side of the road?)

more precise relations between objects (e.g. for detecting near collisions)

better object tracking increased accuracy when converting 2D image coordinates into 3D world coordinates better speed estimation

BRIEF DESCRIPTION OF THE DRAWINGS

Further features, effects and advantages of the invention are shown in the following description of a preferred exemplary embodiment of the invention and in the accompanying figures. In each case, a schematic sketch of the principle is shown.

DETAILED DESCRIPTION

Figure 1:
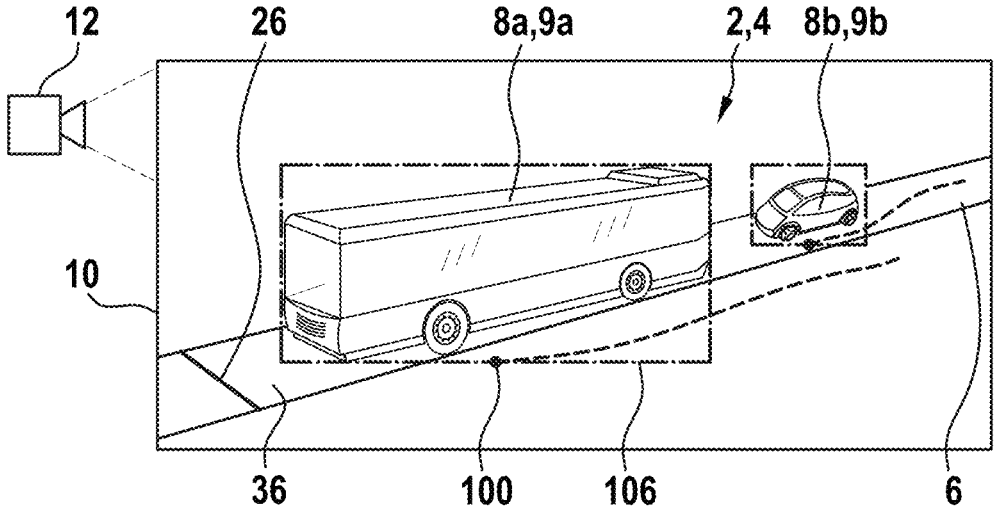
FIG. 1 a camera image of a scene with frame projections not according to the invention, FIG. 2 the camera image from FIG. 2 with frame projections according to the invention, FIG. 3 a flow chart for methods according to the invention, FIG. 4 a camera image of an alternative scene.

FIG. 1 shows a camera image 10 of a scene 2 in the real world, in this case a section of a road traffic network 4, namely a road 6. There are two objects 8*a,b* on road 6 or in scene 2, in this case two motor vehicles in the form of a bus and a car. In scene 2, objects 8*a,b* are located on road 6.

FIG. 1 does not show the 3D scene 2 itself, but the camera image 10 as a two-dimensional 2D image of the scene 2, which was recorded by a camera 12 that is only symbolically indicated here. The camera image 10 therefore only contains the two-dimensional image of the scene 2, the objects 8*a, b*, etc.

As explained above, FIG. 1 shows the result of a non-inventive processing of the camera image 10, namely the determination of a respective 2D bounding box 106 and a determined 2D anchor point 100 at each of these. The dashed line indicates how the anchor points 100 move in the camera image 10 due to the movement of the vehicles over several camera images 10 recorded in succession. With regard to the bus, it can be seen that it is not moving on the image of road 6, but next to it, although in scene 2 the bus (object 8*a*) is driving properly on road 6.

Figure 2:
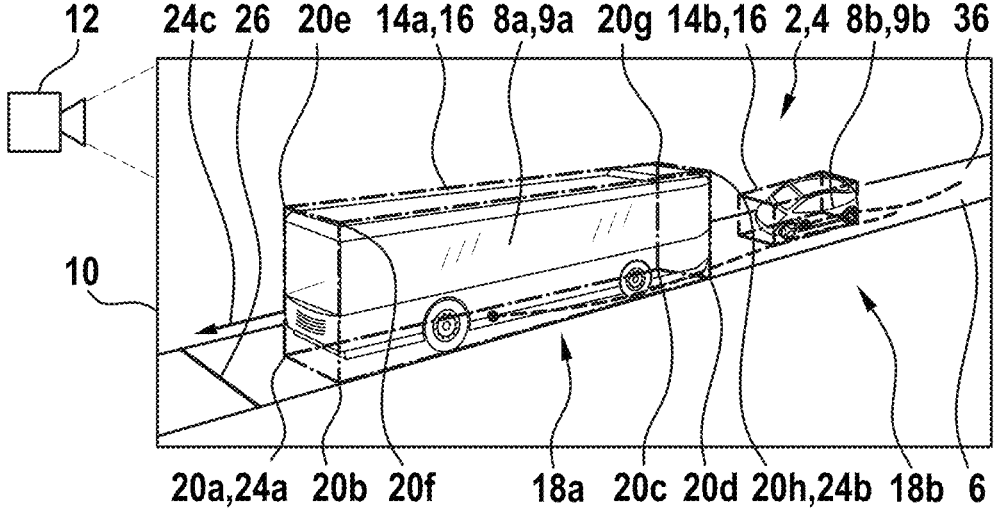

FIG. 2 shows the same camera image 10 from FIG. 1, but now processed using the method according to the invention. The camera image 10 was searched for the potential objects, in this case in the form of vehicles, and the two objects 8*a,b* were actually detected as vehicles 9*a,b*. Vehicles 9*a,b* are therefore detected as potential objects 8*a,b* in the camera image 10. In other words, the method searches for vehicles in scene 2.

A 2D frame projection 14*a,b* was determined for each of the objects 8*a,b* according to the method. The frame projection 14*a,b* is the projection into the camera image 10 or an imaginary cuboid 3D frame 16 (cuboid enveloping body for the object), which would directly surround the object 8*a,b* in the real scene 2. In other words, the object 8*a,b* is completely contained in the enveloping body described by the frame 16 as a polyhedron, wherein the object is tangent to the surface of the enveloping body at a number of points. The frame projection 14*a,b* is thus a pure 2-D object in the camera image 10 or, in this respect, comparable to an image content of the camera image 10. The frame projection 14*a,b* each represents a part of respective information 18*a,b* about the respective object 8*a,b*, which is determined by the method according to the invention.

As a further part of the information 18*a,b*, eight 2D corner point projections 20*a-h* of the 3D frame 16 into the camera image 10 are determined for each of the objects 8*a,b*. The corner point projections 20*a-h* are projections of the 3D corner points of the imaginary 3D frame 16 into the camera image 10. For the sake of clarity, the corner point projections 20*a-h* are only shown for the frame projection 14*a* in FIG. 2.

As a further part of the information 18*a,b*, a 2D anchor point projection 22*a,b* is determined for each of the objects 8*a,b*. The respective anchor point projection 22*a,b* is in turn the projection into the camera image 10 of an imaginary 3D anchor point on or in connection with the real object 8*a* or its frame 16. This is the geometric center of the cuboid surface of the cuboid enveloping body formed by the frame 16 pointing towards the ground (road).

In contrast to FIG. 1, it can be seen that the anchor point projections 22*a,b* in the camera image 10 now actually lie on the image of the road 6, which reflects a realistic position of the vehicles 9*a,b* on the road 6. This enables a significantly improved further evaluation of the camera image 10 provided with or associated with the information 18*a,b*.

In the present case, the anchor point projection 22*a,b* in the method is determined in each case exclusively on the basis of the frame projection 14*a,b* previously determined for the object 8*a,b*.

As a further part of the information 18*a,b*, the orientation information 24*a-c* is determined for each of the objects 8*a,b* according to the method as follows: The orientation information 24*a,b* consists of the selection, determination or marking of the corner point at the front bottom right of the frame 16 and the corner point at the rear top left. The orientation information 24*a-c* is related to characteristics of the objects 8*a,b*/vehicles 9*a,b*. Here, the actual conditions on the image of the vehicle 9*a,b* are evaluated, i.e. "front" means the direction in which the front of the vehicle lies, "rear" that of the rear of the vehicle; "bottom", "top" etc. are based on the usual nomenclature for vehicles according to the regular operating position of the vehicle on a horizontal surface.

Further orientation information 24*c* is obtained from the fact that (not shown in the figures) two different camera images 10 are evaluated at different points in time and the displacement of the objects 8*a,b* between the camera images 10. The current direction of travel of the respective vehicles 9*a,b* is determined as orientation information 24*c*, indicated in FIG. 2 by two arrows in the direction of travel.

The information-obtaining method 30 described so far, or the information 18*a,b* obtained thereby, is used within a higher-level monitoring method 28. The latter is used to monitor potential vehicles 9 in scene 2. Due to the anchor points now located on road 6, a precise count of vehicles 9*a,b* on road 6 is possible here. Furthermore, the crossing of a line 26 (imaginary in the scene 2 of the real 3D line, projected as 2D line 26 in the camera image) in the camera image 10 by the vehicles 9*a,b* can be precisely detected. For this purpose, it is monitored whether the anchor point projection 22*a,b* passes the line 26. This is evaluated here in 2D directly in the 2D camera image 10. In this respect, the line 26 in the camera image 10 again represents the projection of a line actually present or imagined in the scene 2 (in 3D space). Since the anchor points are fixedly coupled to the vehicles 9*a,b* according to the method, a respective reliable relation between the vehicles 9*a,b* can also be monitored, for example by monitoring the relative distance of the anchor point projections 22*a,b* from one another.

According to the monitoring method 28, a reliable speed estimation of the vehicles 9*a,b* and a better object tracking is possible due to the local fidelity of the anchor points to the vehicle 9*a,b* and thus of the anchor point projections 22*a,b* to their images.

Figure 3:
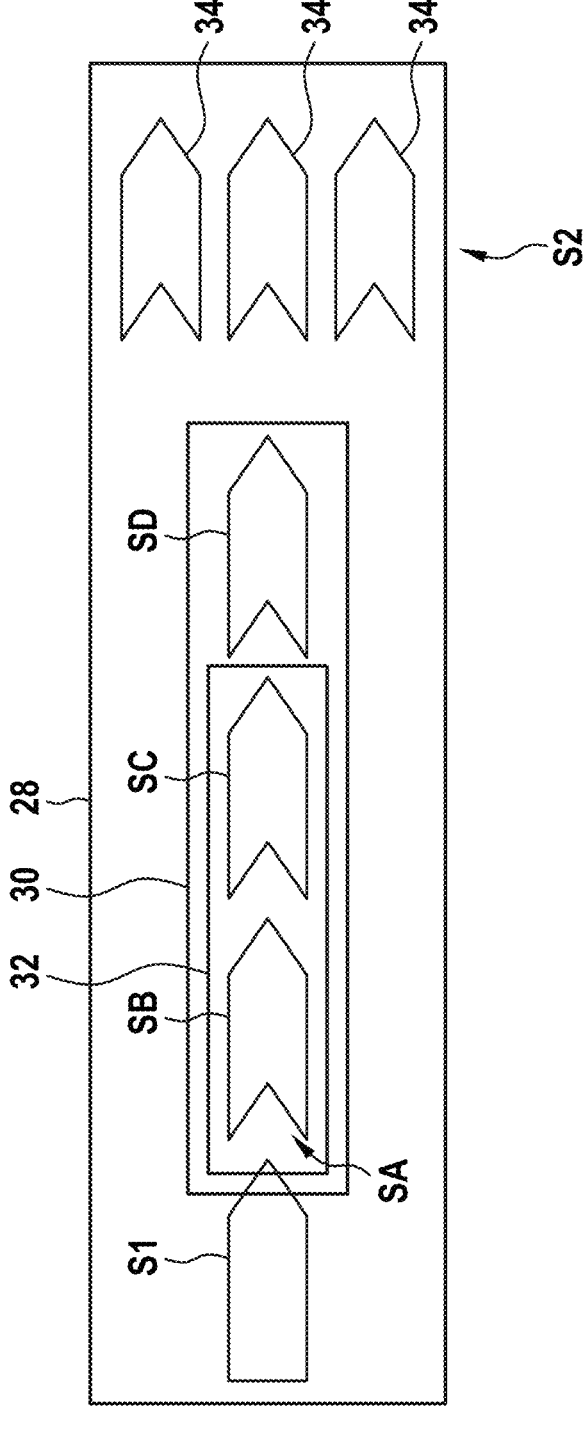

FIG. 3 shows a schematic sketch of the methods on which FIGS. 2 and 3 are based.

In the method 28 for monitoring the vehicles 9*a,b*, the camera image 10 of the scene 2 is first generated in a first step S1. Now, within the method 28, the method 30 for obtaining the information 18*a,b* about potential objects 8 begins. In a first step SA, the camera image 10 is provided to the method 30. In a step SB, the objects 8*a,b* are detected in the camera image 10. In step SC, the respective frame projection 14*a,b* in the camera image 10 is determined as information 18*a,b* for at least one of the detected objects, if such objects were detected in step SB. Both steps SB and SC are carried out with the help of a neural network. In the present case, both steps are carried out together using a common deep neural network 32 (indicated by a frame in FIG. 3). The method 30 is performed without using a heat map associated with the camera image 10, without using calibration data of the camera 12 and without any assumption about the scene 2 depicted in the camera image 10. Furthermore, the additional parts of the information 18*a,b* explained above are determined in a step SD (corner point projections 20*a-h*, anchor point projections 22*a,b*, . . . ). The information 18*a,b* is now available as results or output variables of the method 30 in the method 28. Based on the determined information 18*a,b*, further measures 34 are now carried out in steps S2 of the method 28, here the above-mentioned counting of the objects 8*a,b* on the road 6, the monitoring of the crossing of the line 26, etc.

Figure 4:
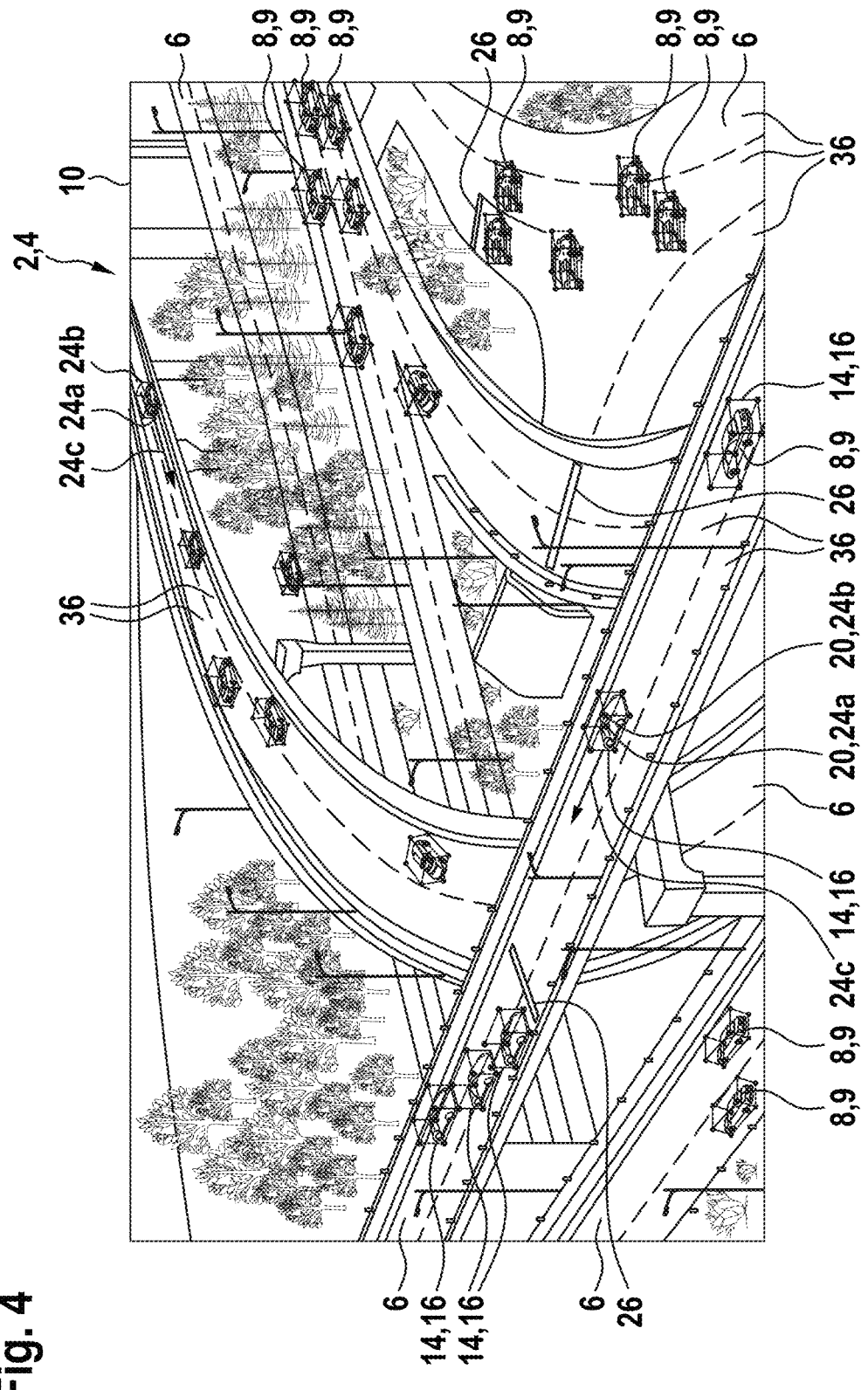

FIG. 4 shows a camera image 10 of an alternative scene 2. A camera 12, which generates the camera image 10 and is not shown here, is aimed at a traffic junction of a traffic network in a large city. The camera image 10 therefore shows a large number of roads 6, some of which have a plurality of lanes 36.

The methods 28 and 30 are now also applied to the camera image 10 from FIG. 4. FIG. 4 shows the result of this, namely the frame projections 14 of the imaginary frames 16, in this case the 3D bounding boxes in cuboid form, drawn correctly in the camera image 10 in a particularly challenging traffic monitoring scenario.

For example, circles illustrate the corner point projections 20. The corner points at the front bottom right of the vehicle 9 are again determined as orientation information 24*a*, the corner points at the rear top left of the car as orientation information 24*b* and so on.

These features are also estimated very precisely if they are obscured by other structures or objects. The method 30 only requires the pure video image, i.e. one of the camera images 10 in each case, and is not dependent on additional information (such as camera calibration) or limiting assumptions.

Thanks to the performance of the method 30, it is possible to capture a large number of objects 8, in this case vehicles 9, in real time in the camera image 10 or each additional camera image 10 (not shown) of a video stream. Based in particular on the orientation information 24*a-c*, which is determined for each of the objects 8, it is also automatically recognizable here whether all vehicles 9 are moving in the prescribed direction of travel on the respective road 6, or whether vehicles are also oriented against the direction of travel or are moving backwards in an unauthorized manner.

The crossing of lines actually present in the scene, which in turn are depicted as lines 26 in the camera image 10, can also be easily and reliably monitored here. It is also possible to precisely assign the corresponding objects 8 or vehicles 9 to their currently used lanes 36.

The invention claimed is:

1. A method (30) for obtaining information (18*a, b*) about an object (8*a, b*) in a camera image (10) of a scene (2), in which A) the camera image (10) is provided as a single 2D camera image, B) potential objects (8*a, b*) are detected in the camera image (10), C) for at least one of the detected objects (8*a, b*), a frame projection (14*a, b*) of a 3D frame (16) directly surrounding the object (8*a, b*) is determined in the camera image (10) as at least part of the information (18*a, b*), wherein steps B) and C) are each carried out via a neural network (32), and at least one anchor point projection (22*a, b*) of an anchor point correlated with the object (8*a, b*) is determined in the camera image (10) for at least one of the objects (8*a, b*) as part of the information (18*a, b*).

2. The method (30) according to claim 1, wherein corner points of the 3D frame are determined without using a heat map associated with the camera image (10) and/or the method (30) is performed without using calibration data of a camera generating the camera image and/or assumptions about the scene depicted in the camera image.

3. The method (30) according to claim 1, wherein
steps B) and C) are carried out together via a common neural network (32).

4. The method (30) according to claim 1, wherein
at least one corner point projection (20*a-h*) of the frame (16) into the camera image (10) is determined for at least one of the objects (8*a, b*) as part of the information (18*a, b*).

5. The method (30) according to claim 1, wherein
the anchor point projection (22*a, b*) is determined based on the frame projection (14*a, b*) previously determined for the object (8*a, b*).

6. The method (30) according to claim 1, wherein
in step B, at least one vehicle (9*a, b*) is detected as a potential object (8*a, b*) in the camera image (10).

7. The method (30) according to claim 1, wherein
at least one piece of orientation information (24*a-c*) of the frame (16) and/or the object (8*a, b*) is determined for at least one of the objects (8*a, b*) as part of the information (18*a, b*).

8. The method (28) for monitoring vehicles (9*a, b*) in a scene (2), in which
the method (30) according to claim 1 is performed using the camera image (10) of the scene,
wherein at least one vehicle (9*a, b*) is detected as a potential object (8*a, b*),
at least one of the following measures (34) is performed on the basis of the determined information (18*a, b*) relating to the objects (8*a, b*):
a count of vehicles (9*a, b*) on a road (6) in the scene (2),
a control of a traffic light correlated with the scene (2),
monitoring of a crossing of an existing or imaginary line (26) in the scene (2) by an object (8*a, b*),
an assignment of objects (8*a, b*) to a lane (36) in the scene (2),
detection of an incorrect position and/or movement of an object (8*a, b*) in the scene (2),
a determination of a relation between at least two detected objects (8*a, b*),
tracking of objects (8*a, b*) in the scene (2),
a conversion of 2D image coordinates with respect to at least one object (8*a, b*) into 3D world coordinates,
a speed estimation of at least one of the objects (8*a, b*) in the scene (2).

* * * * *